UNITED STATES PATENT OFFICE.

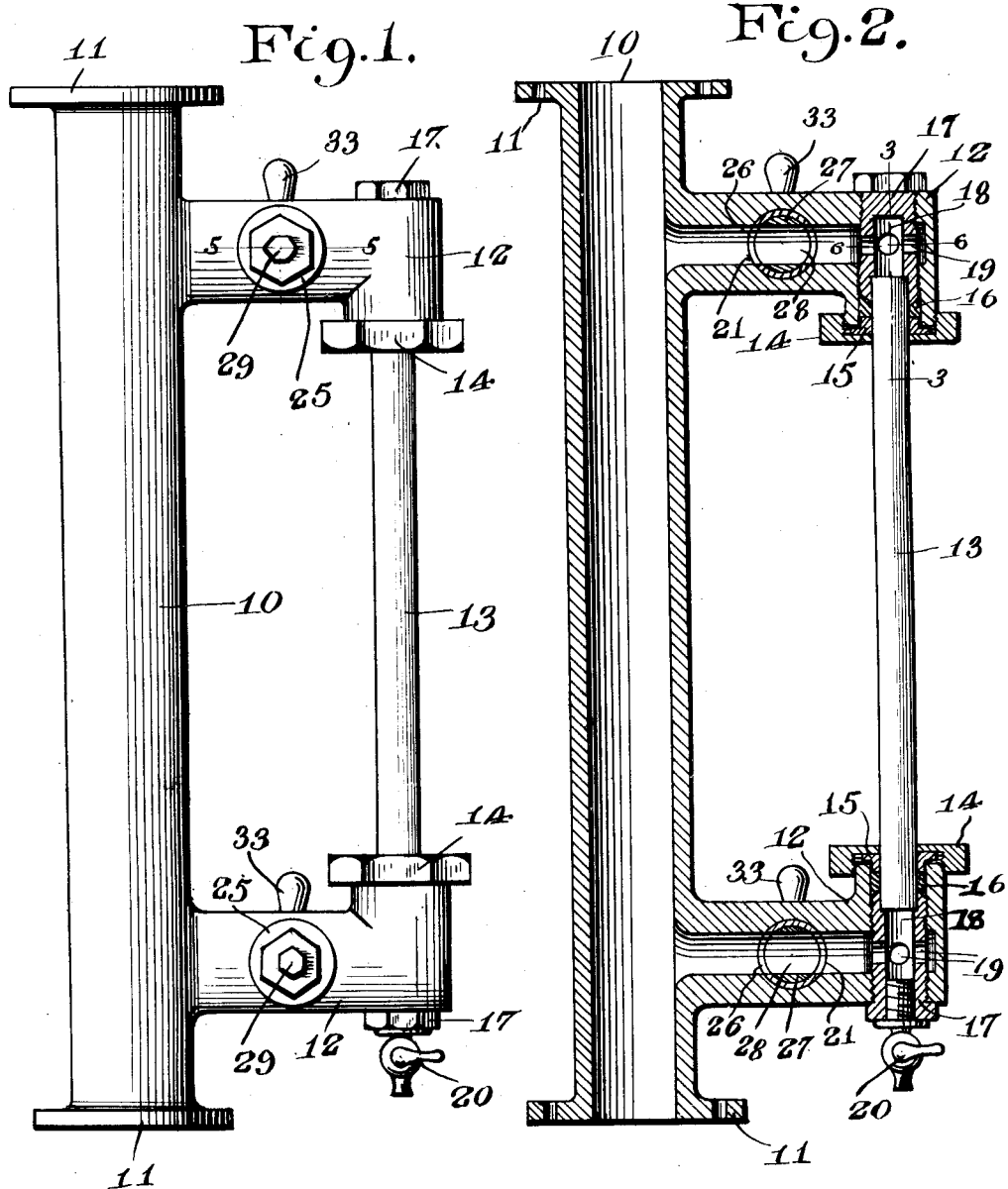

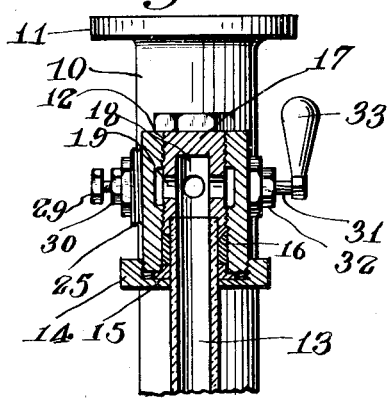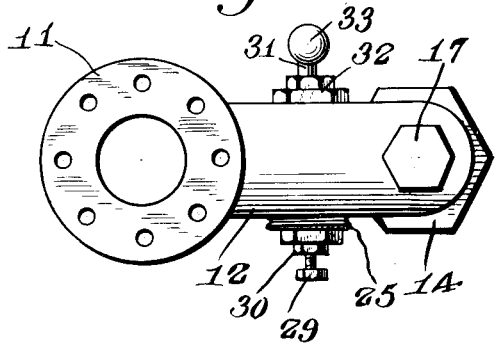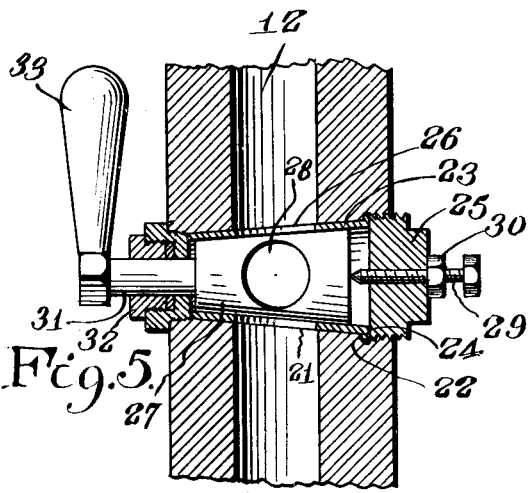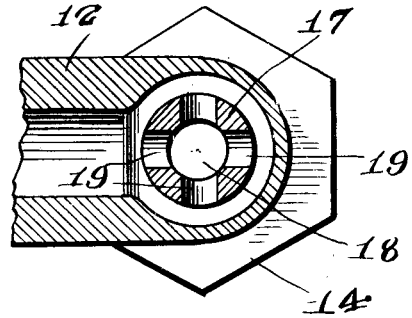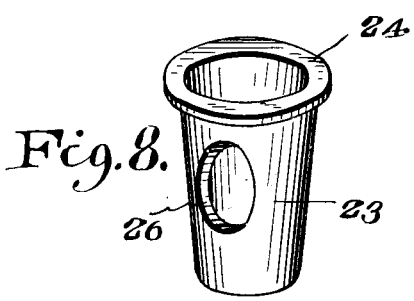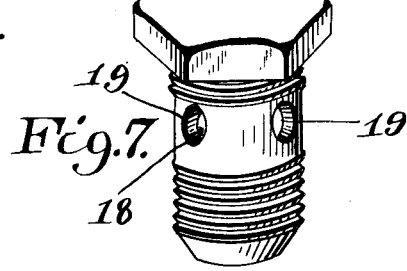

THOMAS C. SALTER, OF SAN FRANCISCO, CALIFORNIA.

GAGE-GLASS FIXTURE.

1,077,758.

Specification of Letters Patent.

Patented Nov. 4, 1913.

Application filed December 5, 1912. Serial No. 735,125.

*To all whom it may concern:*

Be it known that I, THOMAS C. SALTER, a citizen of the United States, residing at San Francisco, in the county of San Francisco, State of California, have invented certain new and useful Improvements in Gage-Glass Fixtures; and I do hereby declare the following to be a full, clear, and exact description of the invention, such as will enable others skilled in the art to which it appertains to make and use the same.

This invention relates to water glass fixtures for boilers and has for an object to provide an extremely simple fixture that will permit of a broken water glass being renewed by simply unscrewing a single nut.

A further object of the invention is to provide a device of this character which will be composed of a few number of extremely simple and durable parts that will not easily get out of order.

A still further object of the invention is to provide a novel form of valve having a removable seat which may be easily and quickly renewed by unscrewing a single nut.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of the water glass fixture. Fig. 2 is a longitudinal sectional view through the fixture. Fig. 3 is a vertical sectional view taken on the line 3—3 Fig. 2. Fig. 4 is a plan view of the fixture. Fig. 5 is a vertical sectional view taken on the line 5—5 Fig. 1. Fig. 6 is a cross sectional view taken on the line 6—6 Fig. 2. Fig. 7 is a detail perspective view of the removable glass securing nut. Fig. 8 is a detail perspective view of the valve seat.

Referring now to the drawings in which like characters of reference designate similar parts, 10 designates a steam pipe having coupling flanges 11 at the opposite ends for attachment to pipes leading into the steam and water spaces of a boiler, this steam pipe having on one side parallel opposing branches 12 of substantially L-shaped outline as shown.

The water glass 13 of the usual and well known kind is loosely engaged terminally in the vertically alined bores of the L-shaped branches 12, and for detachably securing the glass in position a nut 14 is threaded on the extremity of each L-shaped branch and confines a gland 15 within the bore of the branch, there being a packing ring 16 disposed in said bore and compressed by a nipple nut 17 which is threaded into the heel of said branch and is provided with intersecting longitudinal and transverse openings 18 and 19 which register respectively with the water glass and with the horizontal bore of the branch, as clearly shown in Figs. 2 and 6. Should the glass become broken, by simply unscrewing and removing the nipple nut of the upper branch, the broken ends may be passed upwardly through the related branches and entirely removed from the fixture. A new glass may then be dropped vertically through said branches and the nipple nut replaced to secure the new glass in position. The nipple nut of the lowermost branch is equipped with a drip cock 20 of the usual and well known kind by means of which sediment and the like may be blown from the glass when necessary.

For cutting off communication between the boiler and water glass, each of the branches 12 is formed with a tapered opening 21 which intersects the bore of the branch and is enlarged at one end to form a shoulder 22. A tapered bushing 23 is fitted in this opening and provided at one end with a flange 24 which fits against the shoulder and is clamped thereto by a nut 25 the removal of which permits of removing the bushing and replacing the same with a new one when necessary. The bushing is provided with openings 26 in the sides which register with the bore of the branch. The bushing forms a seat for tapered plug valve 27 which is provided with a transverse port 28, this valve being held in operative position by means of a set screw 29 threaded through the nut 25 and engaged with the valve, the set screw being held in position by a lock nut 30 which is advanced into engagement with the nut 25. The valve is provided with a stem 31 which projects through a stuffing box 32 that is threaded into the opening 21, the stem being terminally equipped with a handle 33 by means of which the valve may be rotated to open or closed position.

What is claimed, is:—

A water level indicator comprising superposed substantially L-shaped pipes having opposing vertically alined ends, a sight glass terminally inserted in said ends, nuts on said ends, glands confined within said ends by said nuts, packing rings surrounding said glass, and nipple nuts threaded into said ends against said glass and compressing said packing rings against said glands, each nipple nut having intersecting passages communicating with the bore of the related pipe and with said glass.

In testimony whereof, I affix my signature, in the presence of two witnesses.

THOMAS C. SALTER.

Witnesses:
E. N. DOERINGER,
A. C. ST. MARIE.